June 14, 1938.　　　A. C. SCHOLAERT　　　2,120,576
MEANS FOR CONTROLLING THE WORKER OF TEASING MACHINES
Filed July 10, 1935　　　3 Sheets-Sheet 1

INVENTOR
ALBERT C. SCHOLAERT
BY
Richards & Geier
ATTORNEYS

June 14, 1938. A. C. SCHOLAERT 2,120,576
MEANS FOR CONTROLLING THE WORKER OF TEASING MACHINES
Filed July 10, 1935 3 Sheets-Sheet 2

INVENTOR
ALBERT C. SCHOLAERT
BY
Richards & Geier
ATTORNEYS

June 14, 1938. A. C. SCHOLAERT 2,120,576
MEANS FOR CONTROLLING THE WORKER OF TEASING MACHINES
Filed July 10, 1935 3 Sheets-Sheet 3
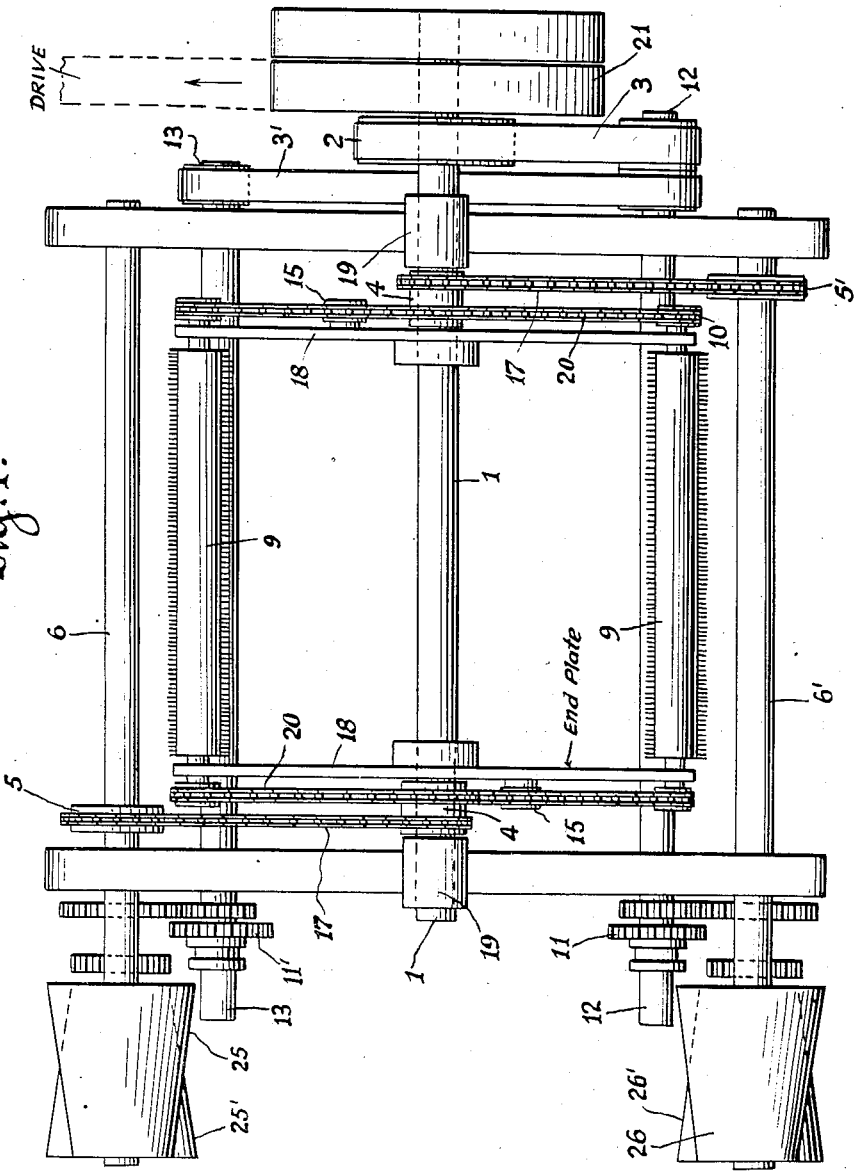
Inventor:
ALBERT C. SCHOLAERT
By: Richards & Geier
Attorneys:

Patented June 14, 1938

2,120,576

UNITED STATES PATENT OFFICE 2,120,576

MEANS FOR CONTROLLING THE WORKER OF TEASING MACHINES

Albert C. Scholaert, Tourcoing, France

Application July 10, 1935, Serial No. 30,614
In France July 27, 1934

1 Claim. (Cl. 26—34)

This invention relates to means adapted to permit the worker rollers of teasing machines to be controlled from the center of the cylinder.

It is known that generally the teasing machines hitherto employed have their worker rollers controlled by a belt which is driven by a member placed outside the cylinder, and this does not permit the said belt to envelop the whole of the pulleys keyed upon the worker rollers. The pulleys situated at the base lose contact with the belt and consequently irregularities occur in the speed which may produce irregularities in the work.

The object of the invention is to enable the belt to be driven from the center of the cylinder carrying the worker rollers, which belt wholly envelops the pulleys driving these worker rollers.

This arrangement has the further advantage that it permits the use of an endless chain instead of a belt, a result which could not be obtained with existing machines, and by means of which the slip occurring in known systems can be avoided.

In the accompanying drawings, which are given by way of example and in order to enable the invention to be clearly understood:

Figure 4 is a plan view of the device shown in Figures 1 and 3.

Figure 1:
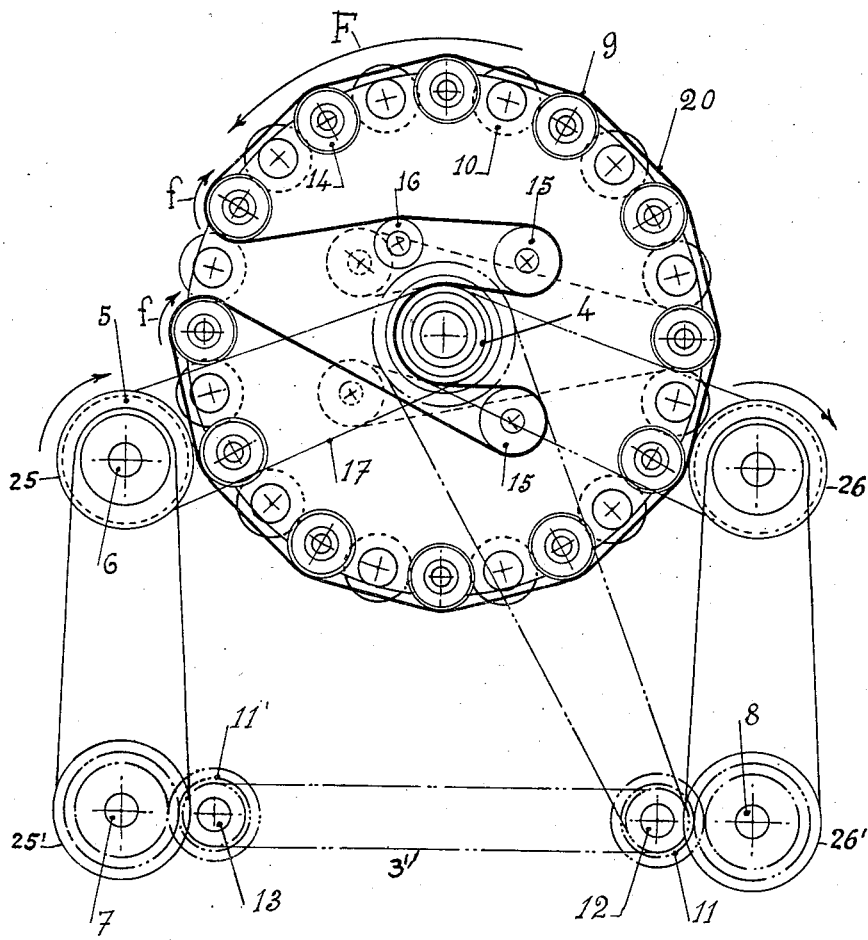
Figure 1 is an elevation of a cylinder provided with worker rollers and its driving device.

In these figures, the device for carrying out the present invention comprises a cylinder of a teasing machine, the worker rollers of which are situated on both sides of the cylinder and are driven thereby.

For this purpose a pair of central pulleys 4 are loosely mounted upon a shaft 1, externally to the plates 18 of the cylinder and between the supports 19 of the shaft 1, and these pulleys are driven by means of belts or chains 17 and 71' passing over the pulleys 5 and 5' keyed upon the shafts 6 and 6', which may be driven by any usual means, for example, through the medium of conical pulleys 25 and 26.

The shaft 7 carrying a lower pulley 25' drives the pulley 25 by means of a belt passing over the pulleys 25' and 25, while the shaft 8 carrying a lower pulley 26' drives the pulley 26 by means of a belt passing over the pulleys 26 and 26'.

These shafts 7 and 8 are driven by means of two sliding pinions 11 and 11' having a different number of teeth in order to obtain the whole range of desired speeds.

The shafts 12 and 13, upon which the sliding pinions 11 and 11' can move laterally, are driven by the shaft 1 of the cylinder by means of a belt 3 passing over a pulley 2 and another pulley keyed upon the shaft 12. Another belt 3' passes over a pulley keyed upon the shaft 12 and another pulley keyed upon the shaft 13, thereby transmitting the rotation of the shaft 12 to the shaft 13. The shaft 1 is rotated from a motor (not shown) by means of the pulley 21.

When the shaft 1 is driven in the direction of the large arrow, and assuming the pulleys 4 to be stationary and held at rest by the belts 17, the worker rollers 9 and 10 rotatably mounted in the plates 18 of the cylinder will turn with a speed proportional to the diameter of the pulleys 4 and of those keyed upon the worker rollers, due to the provision of the belts or chains 20 passing over the last-mentioned pulleys and the pulleys 4.

If one of the central pulleys 4 is moved progressively by its belt 17 in the direction indicated, and by means of the above-mentioned speed varying devices, the enveloping part of the belt or chain 20 will appear to turn in the opposite direction to that in which it is moved, as long as the linear speed of the cylinder is greater than the linear speed of the belt or chain.

When these speeds are in perfect synchronism, the said belt or chain will appear to remain stationary and the worker rollers will at this moment turn as if their pulleys ran upon a fixed belt enveloping them externally.

If the speed of the pulley 4 continues to be accelerated, the enveloping part of the belt or chain 20 will then travel in the given direction, that is to say, opposite to the direction of rotation of the cylinder and so on until the limit of requirements has been reached.

It will be seen that by this method it is possible to obtain any desired raised, teased or felted effects with great accuracy and perfect uniformity, particularly when use is made of an enveloping chain, which allows no slip.

In fact with the present means, it is possible to obtain from the worker rollers, without making any modification in the direction of rotation of the actuating means, different conditions of work depending upon whether the speed of rotation of these worker rollers is above or below synchronism.

The other known actuating means do not permit this accuracy of revolution of the worker rollers in the neighbourhood of synchronism. In order to obtain the direction of rotation indicated by the small arrows, small transmission rollers 15 have been provided. A tensioning roller 16 may be provided upon the slack side.

These transmission and tensioning rollers are situated diametrically opposite each other each side of the cylinder, so that they will not destroy the equilibrium.

Figure 2:
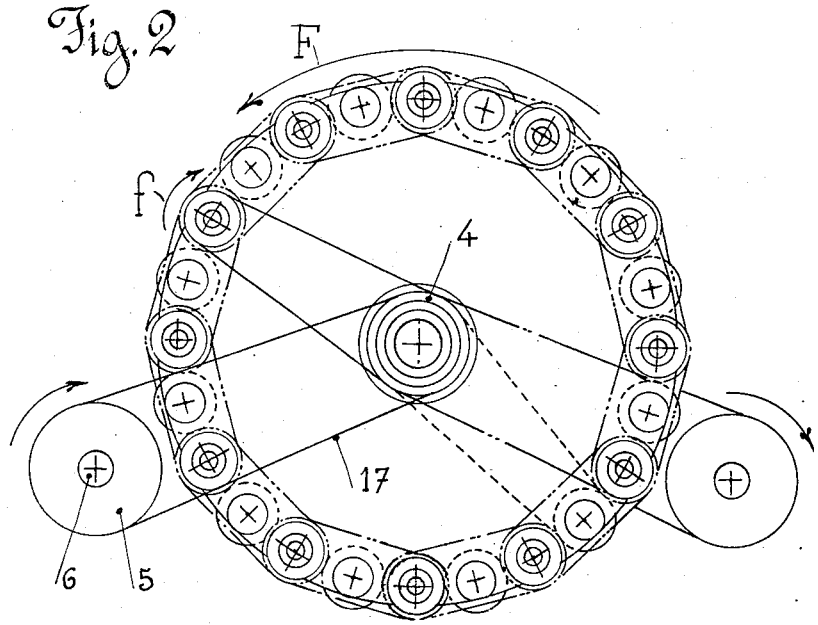
Figure 2 shows a modification.
Figure 3:
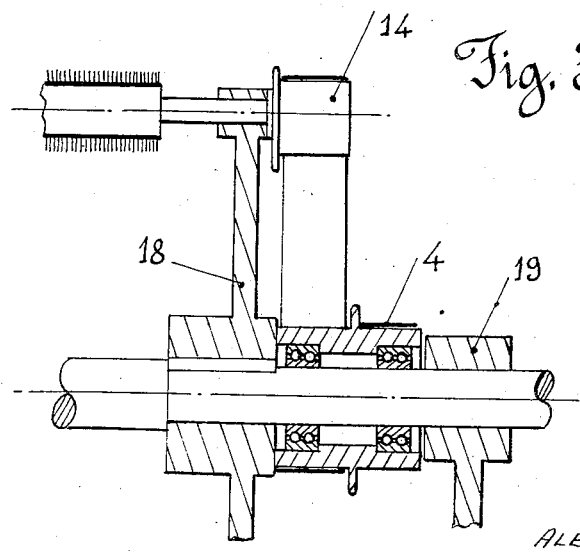
Figure 3 is a cross section through the loose double central pulley.

The modification illustrated in Figure 2 shows the central pulley 4 actuating a single worker roller. The latter can by an endless chain enveloping the other worker rollers, impart to them the same velocity, or else drive each worker roller individually, one driving the other and so on as illustrated, by chain, belt or intermediate pinions or by any other means. This device permits the worker rollers to be actuated from the interior of the plates of the cylinder; only the belt or the chain driving the first worker roller will be situated outside of the cylinder.

It will be understood that modifications may be made in the arrangement of the worker rollers and that their number may vary, and also that other types of construction may be adopted which utilize the central collective or individual control without on that account going outside the scope of the present invention.

Having now described my invention, what I claim as new and desire to secure by Letters Patent is:—

Means for driving the worker rollers of teasing machines and the like, comprising a shaft, means for rotating said shaft, end plates fixed upon said shaft and rotatable therewith, a plurality of circumferentially disposed worker rollers carried by said end plates, a central pulley loosely mounted upon said shaft and situated outside of each of said end plates, means for individually rotating said worker rollers independently of said end plates and in the opposite linear direction as said end plates, said last mentioned means comprising a pair of reversing pulleys mounted on opposite sides of said central pulley and centrally displaced therefrom and an endless transmission member passing over said central pulley, one pair of said reversing pulleys and alternate working rollers, and a second endless transmission member passing over the second central pulley, the second pair of reversing pulleys and intermediate working rollers said reversing pulleys having a diameter smaller than said central pulleys whereby the individual rotation of said worker rollers will be increased and separate means for rotating said central pulley independently of the means for rotating said shaft whereby the rotation of said end plates and said rollers may be synchronized.

ALBERT C. SCHOLAERT.